3,520,904
PROCESS FOR THE ISOLATION OF N-ACETYL-3-(3,4-METHYLENEDIOXYPHENYL)-L-ALANINE
Toshinori Kurano and Masahide Horiuchi, Kamakurashi, Japan, assignors to Sankyo Chemical Industries Ltd., a corporation of Japan
No Drawing. Filed Sept. 25, 1968, Ser. No. 762,616
Claims priority, application Japan, July 11, 1968, 43/48,682
Int. Cl. C07d 13/10
U.S. Cl. 260—340.5   3 Claims

ABSTRACT OF THE DISCLOSURE

A process for the preparation of N-acetyl-3-(3,4-methylenedioxyphenyl)-L-alanine characterized by forming a salt of N-acetyl-3-(3,4-methylenedioxyphenyl)-D,L-alanine and L-(+)-threo-1-(p-nitrophenyl)-2-amino propane - 1,3 - diol in a mixture of lower saturated aliphatic alcohols, isolating from the mixture N-acetyl-3-(3,4-methylenedioxypenyl) - L-alanine-L-(+)-threo-(p-nitrophenyl)-2-aminopropane - 1,3 - diol salt and thereafter decomposing it with a diluted mineral acid.

---

This invention relates to an optical resolution of N-acetyl - 3 - (3,4 - methylenedioxyphenyl)-D,L-alanine to prepare the L-form in a good yield.

N-acetyl - 3 - (3,4-methylenedioxyphenyl)-L-alanine (referred to hereinafter simply as the L-form with the proviso that other optical isomers are abbreviated as the D,L-form and the D-form) is an important compound as an intermediate for synthesizing 3 - (3,4 - dihydroxyphenyl) - L - alanine (L-DOPA) which is useful as medicament. An economical preparation of this compound depends on how or in what manner the D,L-form is optically resolved to prepare the L-form in a good yield. As means for optically resolving the D,L-form, there is known a process using brucine for resolution [Biochem. J. 25, 1029 (1931)] and a process using cinchonine or Taba-diastase (a Registered Trademark) for resolution [Chem. Pharm. Bull. 10, 680 (1962)]. However, these processes are inappropriate for industrial preparation because of their low yield of the L-form (ca. 70%) and utilization of expensive optically resolving agents.

Accomplished by the present inventors is a process using as an optically resolving agent L-(+)-threo-1-(p-nitrophenyl)-2-aminopropane-1,3-diol (referred to hereinafter simply as the d-base) which is a by-product formed during the production of chloramphenicol.

Namely, this invention relates to a process for preparing L-form in a good yield, which comprises forming a salt of DL-form and d-base in a mixture of alcohols, as solvent, isolating an L-d-base salt from the mixture and then decomposing the salt with a diluted mineral acid.

As a method of using the d-base for optical resolution, there is known hitherto a process wherein a salt of N-acetyl-D,L-phenylalanine and the d-base is formed in a unitary solvent such as water, methanol or n-propanol [J. Praktische Chemie BD-9, 104 (1959)]. The present inventors tried to apply this method to optical resolution of the D,L-form but failed to effect such optical resolution for the reason that in water the preferential precipitation of D-d-base salt is at once followed by the precipitation of L-d-base salt to make it difficult to effect isolation, in methanol the formation of L-d-base salt is small and in isopropanol the formation of D,L-d-base salt takes place.

On optical resolution of the D,L-form, the present inventors could obtain the L-d-base salt in a good yield by permitting the formation of a salt of the L-form with the d-base in a mixture of alcohols. By the term "mixture of alcohols" is meant a solvent composed of at least two lower saturated aliphatic alcohols, preferably, of from 1 to 4 carbon atoms such as methanol, ethanol, n-propanol, isopropanol, n-butanol sec.-butanol and tert.-butanol, and preferably a mixture of methanol and isopropanol. The proportion of alcohols in this case desirably is based mainly on methanol with the necessity that the quantity of methanol becomes larger as the carbon number of the other alcohol increases. For example, the mixing ratio of methanol to isopropanol is preferably 1:0.6–1.3 (i.e., 0.6–1.3 parts of isopropanol per part of methanol) and the mixing ratio of methanol to n-butanol is 1:0.4–0.6 (i.e., 0.4–0.6 part of n-butanol per part of methanol). Practically, no trouble occurs even if the mixture of alcohols contains less than about 10% water. When the d-base is added to the D,L-form in such mixture of alcohols, the L-d-base salt is obtained in the form of crystals, retaining the D-d-base salt dissolved in the mixture of alcohols. Thus, the L-d-base salt free from the D-d-base salt can be separated in an excellently good yield.

The resulting L-d-base salt can be decomposed in a conventional manner, for example, with a diluted mineral acid such as an aqueous solution of hydrochloric acid or sulfuric acid, to obtain the L-form.

Since the D-d-base salt is dissolved in the solvent from which the L-d-base salt has been separated, the solvent is distilled off under reduced pressure to precipitate the D-d-base salt which, after dissolving into water, is decomposed with a diluted mineral acid to obtain the D-form. This D-form easily undergoes racemization in a conventional manner, for example, by the treatment with acetic anhydride in an aqueous solution of sodium acetate and can be reduced to the D,L-form.

The following example illustrates the invention.

EXAMPLE

Into 346 ml. of a mixed solvent of methanol and isopropanol (the mixing ratio being 1:1) are dissolved under warming (about 60° C.) 37.7 g. (0.15 mol.) of the D,L-form. To the homogeneous solution are added 31.8 g. (0.15 mol.) of the d-base. The solution once becomes homogenous but on gradual cooling it permits precipitation of the L-d-base salt. The solution is allowed to stand for 4 hours at room temperature and the crystals of the precipitated L-d-base salt are collected by filtration and washed with isopropanol. The L-d-base salt having M.P. of 180°–182° C. and a specific rotation of $\alpha_D^{21} = +46.9$ (c.=1, water) is thus obtained. Wield 34.1 g. (97.0%).

Next, the L-d-base salt is dissolved into 100 ml. of water and diluted hydrochloric acid is added to adjust pH of the solution to 1. The solution is allowed to stand overnight below 20° C. The crystals precipitated are collected by filtration, washed with water and dried to obtain the L-form having M.P. of 158°–160° C. and a specific rotation of $\alpha_D^{20} = +49$ (c.=1, alcohol). Yield 17.4 g. (95%).

The mother liquid in the optical resolution treatment is concentrated under reduced pressure to remove the solvent and the residue is dissolved into 100 ml. of water and treated as in the case of said L-d-base salt to obtain 17.4 g. of the D-form.

We claim:
1. A process for the preparation of N-acetyl-3-(3,4-methylenedioxyphenyl) - L - alanine characterized by forming a salt of N-acetyl-3-(3,4-methylenedioxyphenyl)-D,L-alanine and L - (+) - threo - 1-(p-nitrophenyl)-2- aminopropane - 1,3 - diol in a mixture of lower saturated aliphatic alcohols, isolating from the mixture N-acetyl-3-(3,4 - methylenedioxyphenyl) - L - alanine - L -(+)- threo - (p - nitrophenyl) - 2 - aminopropane - 1,3 - diol salt and thereafter decomposing it with a diluted mineral acid.

2. The process according to claim 1 wherein said alcohol has from 1 to 4 carbon atoms.

3. The process according to claim 1 wherein said mixture is that of methanol and isopropanol and said mineral acid is hydrochloric acid.

References Cited

Gelpel: "Journ. Fur. Praktis. Chemie," BD-9, 1959, pp. 104–6.

Kato et al.: "Agr. Biol. Chem." (Tokyo), vol. 26, 1962, pp. 467–72.

Yamada et al.: "Chem. Pharm. Bull." (Tokyo), vol. 10(8), 1962, pp. 688–93.

NICHOLAS S. RIZZO, Primary Examiner

J. H. TURNIPSEED, Assistant Examiner